United States Patent Office 2,917,529
Patented Dec. 15, 1959

2,917,529

PREPARATION OF ALKYL CHLOROSILANES

John J. Drysdale, Wilmington, Del., assignor to E. I. du Pont de Nemours and Company, Wilmington, Del., a corporation of Delaware No Drawing. Application July 10, 1956
Serial No. 596,854

10 Claims. (Cl. 260—448.2)

This invention relates to organosilicon compounds and, more particularly, to a new process for the preparation of organohalosilanes.

Organohalosilanes have recently achieved considerable technical importance. Many are used to a large extent, for example, as water repellents. In this usage, chlorosilanes containing from one to three chlorine atoms are particularly employed. Organohalosilanes, including the chlorosilanes, are also versatile chemical intermediates that can be hydrolyzed to siloxanes. Many of the latter are, in turn, important polymeric oils or resins useful for lubricating or film-forming purposes.

Numerous methods have been suggested for the preparation of organohalosilanes. One of the most important has been the reaction of an inorganic halosilane with a Grignard reagent containing the desired hydrocarbon radical. Another method involves the reaction between hydrocarbons and inorganic silicon halides at relatively high temperatures, e.g., 600° C. or higher. The first method is expensive while the second gives by-products formed by thermal decomposition.

Other methods that have been employed for the preparation include the reaction of elemental silicon with alkyl halides and the addition of silicochloroform to olefins in the absence of catalyst. The latter reactions take place at high temperatures, e.g., 450° C. or higher, and are useful for the preparation of alkyl trichlorosilanes. They are not generally useful for the preparation of dialkyl dichlorosilanes. Like the other synthesis mentioned, these also require the initial preparation of a reactant such as the alkyl halide or silicochloroform.

An object of this invention is, therefore, provision of a novel and useful method for preparing organohalosilanes.

Another object is provision of a method for preparing organohalosilanes generally free of the disadvantages of the methods of the prior art.

A particular object is provision of a method for preparing alkyl chlorosilanes in one step directly from elemental silicon.

A further object is provision of a method for synthesizing dialkyl dichlorosilanes from silicon.

The above-mentioned and yet further objects are achieved in accordance with this invention by a process in which an olefinic hydrocarbon is reacted with finely-divided silicon and hydrogen in the presence of stannous chloride or a chloride of copper, and, optionally, silicon tetrachloride.

In a preferred embodiment of the invention, alkyl chlorosilanes are obtained by charging into a pressure-resistant, inert container an olefinic hydrocarbon of up to 8 carbon atoms, comminuted silicon, copper or tin chloride and hydrogen. For each part by weight of the olefin there is employed ½–2 parts of silicon and ¼–2 parts of copper or tin chloride. Hydrogen pressure is 20–200 atmospheres. The reaction mixture is then heated at about 325–400° C. for several hours. The product contains a large proportion of a dialkyl dichlorosilane which can readily be separated, if desired, by distillation. The optional addition of up to 10 parts by weight of silicon tetrachloride for each part of olefin promotes the yield of alkyl trichlorosilanes.

The variables important in carrying out the process of this invention are the reactants, the quantities of reactants, the temperature, the pressure and the reaction time.

Olefinic hydrocarbons suitable for the process of this invention include those having up to 8 carbon atoms, i.e., a total of 2–8, inclusive. These hydrocarbons may have either one or two carbon-to-carbon double bonds but no other multiple bonds between adjacent carbon atoms. Thus included are the alkenes such as ethylene, propylene, isobutylene, pentenes, hexenes, heptenes and the octenes: and the cycloalkenes, particularly those of 5–7 carbon atoms, such as cyclopentene, cyclohexene, cycloheptene and methylcyclohexene. Open chain and cyclic dienes can also be employed, including butadiene, isoprene, cyclopentadiene and cyclohexadiene. Ethylenically unsaturated hydrocarbons that are especially preferred have 4–6 carbon atoms and one carbon-to-carbon double bond. In general ethylenically unsaturated hydrocarbons having terminal unsaturation react most smoothly, while those with internal unsaturation react at a slightly lower rate. Easily polymerized olefins usually give more by-products.

Silicon can be employed in the present reaction either as the element or as an alloy such as copper-silicon or a ferro-silicon. If an alloy is used, the silicon should comprise a substantial part thereof, i.e., 50% or more. The silicon or silicon alloys should have a fairly large surface area available for reaction, the rate of reaction being dependent thereupon. In general, silicon alloys are more active than elemental silicon of the same particle size. The silicon or silicon-containing alloys should preferably be in the form of finely-divided material, usually powders with particles less than a millimeter in diameter. Such powders are commercially available or readily obtained by grinding or ball-milling the silicon or the alloys.

The reaction requires the presence of cuprous chloride, cupric chloride or stannous chloride. These materials are more than catalysts, although they act as such, since in some instances they supply all the halogen present. When the copper chlorides are employed with silicon alloys, conversion can be increased by adding to the reaction mixture a compound capable of forming a complex with the copper chloride. Alkali metal chlorides, sodium and potassium chlorides in particular, are examples of these complexing agents.

Addition of silicon tetrachloride to the reaction mixture is purely optional. Since it promotes the formation of alkyl trichlorosilanes noted above, it will be omitted when a preponderance of dialkyl dichlorosilanes is desired.

The amounts of reactants are subject to considerable variation since conversions and relative yields are dependent upon the specific unsaturated hydrocarbon employed and the reactivity and surface area of the silicon in addition to relative quantities of metal halide and silicon tetrachloride used. For each part by weight of the olefinic hydrocarbon, 2-5 parts of silicon are employed. Such large amounts do not enter into the reaction and the excess silicon can be recovered. The exact quantity of copper or stannous chloride may likewise vary considerably. One-fourth to 2 parts by weight of this chloride is needed for each part of the unsaturated hydrocarbon. Up to 10 or more parts of the optional silicon tetrachloride is utilized for each part of the ethylenically unsaturated hydrocarbon.

The pressure of the hydrogen may also vary widely. Pressures between about 10 and 300 atmospheres are generally used with about 120-200 preferred. An inert gas such as nitrogen or helium can be partially substituted for the hydrogen but, since it enters into the reaction, some of the latter should be present.

The temperature of the reaction should be at least about 325° C. It can be allowed to rise but is preferably kept below 400° C. to minimize decomposition or polymerization reactions of the hydrocarbon.

The reaction time depends to some extent on the temperature and concentration of reactants. Periods of from 1 to 24 hours are customarily employed with 5-20 hours preferred.

The hydrocarbon chlorosilanes obtained according to the process of this invention are usually isolated by distillation. They are in general thermally stable and can be separated from the reactants and from each other by distillation.

As noted above, the alkyl chlorosilanes are important technical products. For general uses, e.g., as water repellents, it is unnecessary that they be carefully purified, mixtures of the compounds being useful and perhaps preferred. Dialkyl dichlorosilanes, as in Example IV below, are particularly important as water repellents and as compounds hydrolyzable to polysiloxanes.

Several advantages of the instant process will be apparent, generally paralleling the objects enumerated. One advantage is that the process can give major amounts of dialkyl dichlorosilanes. A further advantage is that it produces alkyl chlorosilanes from elemental silicon, even in the absence of silicon compounds, by a one-step reaction. Another advantage is that the reaction temperature is lower than in other direct methods. A still further advantage is that the process entails few side-reactions.

The following examples, in which the parts and percentages are by weight, illustrate various aspects of the invention and are not intended to be limiting. Unless otherwise noted, boiling points were taken at atmospheric pressure. Subatmospheric pressures are recorded in mm. of mercury. Solid silicon and silicon alloys were comminuted. Refractive indices are reported in conventional symbolism.

*Example I*

This example shows the production of cyclohexylchlorosilanes by the process of the invention and the beneficial effect of cuprous chloride therein.

(a) A stainless steel shaker tube (capable of holding 400 parts of water) was charged with 171 parts of silicon tetrachloride, 50 parts of cyclohexene, 25 parts of silicon, and 20 parts of cuprous chloride. The bomb was pressured with hydrogen and operated at 2000 lb./sq.in. and 350° C. for 16 hours. Distillation of the reaction product gave 64 parts of material (Compound I), boiling at 201-204° C. and 12-15 parts of material (Compound II), boiling at 102-106° C. (0.1 mm.). Neutralization of these products with sodium hydroxide indicated that Compound I was cyclohexyltrichlorosilane and Compound II was dicyclohexyldichlorosilane. These structure assignments were substantiated by study of the infrared spectra.

(b) When the procedure of (a) was repeated except that 10 parts of copper were employed in place of 20 parts of cuprous chloride and hydrogen was omitted, only 2 parts of product boiling at 201-207° C. ($n_D^{25}$=1.4720) was obtained. Treatment of this product with excess hydrofluoric acid gave cyclohexyltrifluorosilane as demonstrated by nuclear magnetic resonance analysis.

(c) When the procedure of (a) was repeated except that copper chloride was omitted, there was obtained 16 parts of crude cyclohexyltrichlorosilane, contaminated with hydrocarbon, boiling at 204-212° C. This was converted by hydrofluoric acid to cyclohexyltrifluorosilane, boiling at 104° C.

*Example II*

This example shows the production of butylchlorosilanes.

The procedure of Example Ia was substantially repeated except that 25 parts of butene-1 was substituted for the 50 parts of cyclohexene. Distillation of the reaction product gave 18 parts of material boiling at 147-150° C. The neutralization equivalent was 63.6 as compared with a calculated 63.8 for $C_4H_9SiCl_3$. This material was a mixture of normal butyltrichlorosilane and secondary butyltrichlorosilane. Small amounts of higher boiling products, corresponding to dibutyldichlorosilanes and octyltrichlorosilanes, were also obtained.

*Example III*

This example shows the production of butylchlorosilanes from isobutylene.

The reaction of Example II was repeated except that isobutylene was used in place of butene-1. Distillation of the reaction products gave 27 parts of product, boiling at 139-144° C., with a neutralization equivalent of 65.5. The calculated neutralization equivalent for $C_4H_9SiCl_3$ is 63.8. Small amounts of dibutyldichlorosilanes and $C_4H_9Si_2Cl_6$ were also formed.

*Example IV*

This example, showing the accomplishment of the reaction in the absence of silicon tetrachloride, demonstrates a convenient route for the direct production of dialkyl dichlorosilanes.

The shaker tube of Example I was charged with 50 parts of cuprous chloride, 50 parts of silicon, and 50 parts of cyclohexene and pressured to 500 lb./sq. in. with hydrogen. The reaction mixture was shaken for 16 hours at 350° C. with repressuring to maintain 2000 lb./sq. in. with hydrogen as required. Distillation of the reaction product gave approximately 5 parts of impure cyclohexyltrichlorosilane boiling at 196-207° C. and 16 parts, B.P. 100-105° C. (0.2 mm.) of dicyclohexyldichlorosilane ($n_D^{25}$=1.5020). The neutralization equivalent of the latter was 137 (calculated for $(C_6H_{11})_2SiCl_2$: 132.8).

*Example V*

This example shows the use of stannous chloride in the reaction.

The general procedure of Example I was repeated except that 20 parts of stannous chloride was substituted for the cuprous chloride. The reaction product upon distillation gave 23.5 parts of impure cyclohexyltrichlorosilane boiling at 201-218° C.

*Example VI*

This example shows the use of cupric chloride.

The general procedure of Example I was repeated except that cupric chloride was substituted for the cuprous chloride. Distillation of the reaction product gave approximately 54 parts of cyclohexyltrichlorosilane, B.P. 202-207° C., and 12 parts of dicyclohexyldichlorosilane, B.P. 116-120° C. (0.8 mm.).

*Example VII*

This example shows the use of ferrosilicon instead of pure silicon.

(a) The general procedure of Example I was repeated except that an alloy of 85% silicon and 15% iron was used in place of pure silicon. In addition, to minimize the hydrogenation of cyclohexene, the hydrogen was not added until the temperature of the reaction system reached 350° C. Distillation of the product gave 18 parts of crude cyclohexyltrichlorosilane, B.P. 195–210° C., and 5–10 parts of dicyclohexyldichlorosilane, B.P. 128–134° C. (0.6 mm.).

(b) When 20 parts of copper was substituted for the cuprous chloride in the procedure of Example VIIa, only 3.9 parts of product boiling at 207–213° C. was obtained in 8 hours. The product consisted of cyclohexyltrichlorosilane and hydrocarbon.

*Example VIII*

This example shows an embodiment of the invention employing potassium chloride.

The reaction tube described in Example I was loaded with 171 parts of silicon tetrachloride, 50 parts of cyclohexene, 25 parts of cuprous chloride, 25 parts of potassium chloride, and 20 parts of silicon alloy (85% silicon, 15% iron). The reaction tube was heated to 350° C. under autogenous pressure, pressured to 2000 lb./sq. in. with hydrogen and then repressured as needed to maintain this pressure. The reaction was run for 8 hours. Distillation of the reaction product gave 18 parts of crude cyclohexyltrichlorosilane boiling at 200–210° C. A residue of 4 parts consisted primarily of dicyclohexyldichlorosilane with a neutralization equivalent of 136.

The potassium chloride formed a complex compound with the cuprous chloride. The complex then reduced the formation of undesirable by-products and aided in controlling the rate of reaction. Conversion of cyclohexene to the alkyl chlorosilanes based on the non-recovered olefin was above 75%.

*Example IX*

The general procedure of Example I was repeated except that 30 parts of cis-2-butene was used in place of the cyclohexene. Distillation of the reaction product gave approximately 12 parts of material boiling at 145–148° C. The neutralization equivalent indicated that this material was principally secondary butyltrichlorosilane. Small amounts of dibutyldichlorosilane were also formed.

*Example X*

The general procedure of Example IV was repeated except that 50 parts of cis-2-butene was used instead of 50 parts of cyclohexene and the reaction was run for 8 hours. Distillation of the reaction product gave the following:

| Fraction | B.P. (° C.) | Amount (parts) |
|---|---|---|
| A | 193–207 | 3.1 |
| B | 207–210 | 3.4 |
| C | 210–211 | 4.4 |
| D | 211–213 | 3.6 |

The neutralization equivalent for Fraction B was 112.5 and that for Fraction C was 111 (calculated for $C_8H_{18}SiCl_2$:107). Fractions B, C and D were primarily $C_8H_{18}SiCl_2$, probably contaminated with a small amount of hydrocarbon.

*Example XI*

The general procedure of Example I was repeated except that 50 parts of 2-octene was used in place of 50 parts of cyclohexene and the reaction was run for 8 hours. Distillation of the reaction product gave the following:

| Fraction | B.P. (° C.) | Refractive Index ($n_D^{25}$) | Amount (parts) |
|---|---|---|---|
| A | 224–232 | 1.4508 | 23 |
| B | 232 | 1.4512 | 4.2 |
| C | 124 (at 0.3 mm.) | | 4.7 |

The neutralization equivalent for Fraction A was 82 (calculated for $C_8H_{17}SiCl_3$: 82.6); and that for Fraction C was 117 (calculated for $C_{16}H_{34}SiCl_3$:120).

*Example XII*

The reaction of Example XI was repeated except that 25 parts of dicyclopentadiene was employed as the unsaturated hydrocarbon. Distillation of the reaction product gave one part boiling at 77° C. at 26 mm. ($n_D^{25}$=1.4740). The neutralization equivalent was 78.5 (calculated for $C_5H_7SiCl_3$, 1 - trichlorosilyl - 2 - cyclopentene:67). The product was probably contaminated with a small amount of dicyclopentadiene. A higher boiling fraction (B.P. 94–100° C. at 2 mm.; $n_D^{25}$=1.4990; neutralization equivalent, 65.6), corresponding to $C_{10}H_{14}Si_2Cl_6$, was also obtained.

*Example XIII*

This example, included solely as a control, shows that the copper or tin chloride should be present as such during the reaction rather than as a mixture of silicon tetrachloride and the metal.

A stainless steel shaker tube capable of holding 400 parts of water was charged with 171 parts of silicon tetrachloride, 25 parts of silicon and 20 parts of cuprous chloride, and pressured to 100 lb./sq. in. with nitrogen. The mixture was heated at 350° C. for 4 hours to convert the copper chloride and silicon to copper and silicon tetrachloride. At the end of this period, the bomb was cooled to room temperature and opened and 50 parts of cyclohexene added thereto. The bomb was then repressured with hydrogen to 300 lb./sq. in. and reheated to 350° C. The pressure was maintained at 2000 lb./sq. in. with hydrogen by repressuring as needed for 8 hours. Distillation of the reaction product gave about 13 parts of cyclohexyltrichlorosilane and 2 to 3 parts of dicyclohexyldichlorosilane.

The embodiments of the invention in which an exclusive property or privilege is claimed are defined as follows:

1. The process which comprises reacting silicon tetrachloride, an ethylenically-unsaturated hydrocarbon possessing 2–8 carbon atoms and at most two carbon-to-carbon double bonds and a comminuted member of the group consisting of silicon and alloys thereof in the presence of hydrogen under a pressure of about 10–300 atmospheres and a metal chloride of the group consisting of stannous, cuprous and cupric chlorides at a temperature of about 325–400° C. and thereby forming alkyl chlorosilanes.

2. The process of claim 1 in which the ethylenically-unsaturated hydrocarbon possesses 4–6 carbon atoms.

3. The process of claim 1 in which the pressure is about 20–200 atmospheres.

4. The process of claim 1 in which the reaction time is about 1–24 hours.

5. The process of claim 1 in which the ethylenically-unsaturated hydrocarbon is a member of the group consisting of cyclohexene, butene-1, butene-2, isobutylene, 2-octene and dicyclopentadiene.

6. The process of claim 1 employing cuprous chloride and, additionally, a chloride of an alkali metal.

7. The process of claim 1 employing cupric chloride and, additionally, a chloride of an alkali metal.

8. The process of claim 1 in which the weight of metal chloride employed is between about one-fourth and twice as much as that of the ethylenically-unsaturated hydrocarbon.

9. The process which comprises reacting an ethylenically-unsaturated hydrocarbon possessing 2–8 carbon atoms and at most two carbon-to-carbon double bonds and a comminuted member of the group consisting of silicon and the alloys thereof in the presence of hydrogen under a pressure of about 10–300 atmospheres, a cuprous chloride, and a chloride of an alkali metal and thereby forming alkyl chlorosilanes.

10. The process which comprises reacting an ethylenically-unsaturated hydrocarbon possessing 2–8 carbon atoms and at most two carbon-to-carbon double bonds and a comminuted member of the group consisting of silicon and the alloys thereof in the presence of hydrogen under a pressure of about 10–300 atmospheres, a cupric chloride, and a chloride of an alkali metal and thereby forming alkyl chlorosilanes.

References Cited in the file of this patent

UNITED STATES PATENTS

| | | |
|---|---|---|
| 2,382,788 | Gorin | Aug. 14, 1945 |
| 2,488,487 | Barry et al. | Nov. 15, 1949 |
| 2,595,620 | Wagner et al. | May 6, 1952 |
| 2,626,271 | Barry et al. | Jan. 20, 1953 |
| 2,710,875 | Daudt | June 14, 1955 |

FOREIGN PATENTS

| | | |
|---|---|---|
| 859,164 | Germany | Dec. 11, 1952 |
| 906,455 | Germany | Mar. 15, 1954 |
| 920,187 | Germany | Nov. 15, 1954 |

OTHER REFERENCES

Spring: "Zeitschrift fur Anorganische Chemie," (Germany), vol. 1, (1892) pages 240–44.

Mellor: "A Comprehensive Treatise on Inorganic and Theoretical Chemistry," Longmans, Green and Co., publishers, New York, 1923, vol. 3, p. 157.

Carli: "Atti della Reale Accademia Nazionale dei Lincei," vol. 33 (1924), pages 94–97.